(12) United States Patent
Lebel et al.

(10) Patent No.: US 9,290,653 B2
(45) Date of Patent: Mar. 22, 2016

(54) PHOSPHONATE POLYMERS, COPOLYMERS, AND THEIR RESPECTIVE OLIGOMERS AS FLAME RETARDANTS FOR POLYESTER FIBERS

(75) Inventors: Marc-Andre Lebel, Boxborough, MA (US); Lawino Kagumba, Cambridge, MA (US); Pin Go, Groton, MA (US)

(73) Assignee: FRX Polymers, Inc., Chelmsford, MA (US)

( * ) Notice: Subject to any disclaimer, the term of this patent is extended or adjusted under 35 U.S.C. 154(b) by 867 days.

(21) Appl. No.: 13/297,788

(22) Filed: Nov. 16, 2011

(65) Prior Publication Data

US 2012/0121843 A1    May 17, 2012

Related U.S. Application Data

(60) Provisional application No. 61/414,569, filed on Nov. 17, 2010.

(51) Int. Cl.

| C08G 18/38 | (2006.01) |
| C08L 67/02 | (2006.01) |
| A47G 9/02 | (2006.01) |
| A47G 9/10 | (2006.01) |
| D01F 1/02 | (2006.01) |
| D01F 1/07 | (2006.01) |
| D01F 6/62 | (2006.01) |

(52) U.S. Cl.
CPC .............. *C08L 67/02* (2013.01); *A47G 9/0207* (2013.01); *A47G 9/0238* (2013.01); *A47G 9/10* (2013.01); *D01F 1/02* (2013.01); *D01F 1/07* (2013.01); *D01F 6/62* (2013.01); *Y10T 428/1397* (2015.01); *Y10T 428/249921* (2015.04); *Y10T 428/298* (2015.01); *Y10T 442/20* (2015.04); *Y10T 442/3984* (2015.04); *Y10T 442/696* (2015.04)

(58) Field of Classification Search
CPC .. C08L 67/00; C08L 2205/16; C08L 2201/02
USPC ........ 428/36, 92, 364; 524/35, 107, 147, 323, 524/539, 610; 525/390, 394, 391
See application file for complete search history.

(56) References Cited

U.S. PATENT DOCUMENTS

| 3,719,272 | A | 3/1973 | Bodine et al. |
| 3,719,727 | A | 3/1973 | Masai et al. |
| 4,180,495 | A | * 12/1979 | Sandler .................. 524/135 |
| 6,861,499 | B2 | 3/2005 | Vinciguerra et al. |
| 7,645,850 | B2 | 1/2010 | Freitag |
| 7,666,932 | B2 * | 2/2010 | Freitag et al. ............ 524/123 |
| 7,816,486 | B2 | 10/2010 | Freitag et al. |
| 7,838,604 | B2 | 11/2010 | Freitag |
| 2004/0137227 | A1 | 7/2004 | Masuda et al. |
| 2007/0129511 | A1 * | 6/2007 | Freitag ..................... 525/538 |
| 2007/0203269 | A1 * | 8/2007 | Freitag et al. ............ 524/123 |
| 2009/0032770 | A1 | 2/2009 | Freitag et al. |
| 2010/0130703 | A1 | 5/2010 | Freitag |
| 2011/0263745 | A1 * | 10/2011 | Wanzke et al. ............ 521/182 |

FOREIGN PATENT DOCUMENTS

| CA | 2451470 | 1/2003 |
| JP | H11-124732 | 5/1999 |
| JP | 2004-044022 A | 2/2004 |
| JP | 2004-052131 A | 2/2004 |
| JP | 2010-229390 | 10/2010 |
| KR | 10-1980-000093 B1 | 1/1980 |
| WO | WO2009/012286 | 1/2009 |

OTHER PUBLICATIONS

Levchik et al., A Review of Recent Progress in Phosphorus-based Flame Retardants, *Journal of Fire Sciences*, Sep. 1, 2006, 24(5):345-364.

International Search Report and Written Opinion dated Jun. 29, 2012 for PCT/US2011/061015.

* cited by examiner

*Primary Examiner* — Hannah Pak
(74) *Attorney, Agent, or Firm* — Pepper Hamilton LLP

(57) ABSTRACT

The invention relates to the use of polyphosphonates, copoly(phosphonate ester)s, copoly(phosphonate carbonate)s, and their respective oligomers, as flame retardant additives for polyester fibers to impart fire resistance while maintaining or improving processing characteristics for melt spinning fibers.

25 Claims, No Drawings

PHOSPHONATE POLYMERS, COPOLYMERS, AND THEIR RESPECTIVE OLIGOMERS AS FLAME RETARDANTS FOR POLYESTER FIBERS

B. CROSS-REFERENCE TO RELATED APPLICATIONS

This application claims priority from U.S. Provisional Application No. 61/414,569 entitled "Phosphonate Polymers, Copolymers, and Their Respective Oligomers as Flame Retardants for Polyester Fibers" filed Nov. 17, 2010, which is herein incorporated by reference in its entirety.

C. GOVERNMENT INTERESTS

Not applicable.

D. PARTIES TO A JOINT RESEARCH AGREEMENT

Not applicable.

E. INCORPORATION BY REFERENCE OF MATERIAL SUBMITTED ON A COMPACT DISC

Not applicable.

F. BACKGROUND

A number of approaches have been investigated to impart fire resistance to polyester fibers with varying degrees of success. In general, it has been extremely challenging to impart fire resistance into polyester fibers without detracting from other important properties such as processability (i.e., melt viscosity increase), ability to melt spin fibers, and mechanical properties. Thus, there is a recognized need to provide fire resistance to polyester fibers without detracting from melt processability, strength, modulus, dyeing and heat-setting characteristics as compared to the unmodified polyester.

G. SUMMARY OF THE INVENTION

Embodiments are generally directed to a polymer fiber that includes a thermoplastic polyester and at least one phosphorous containing polymer or oligomer. In various embodiments, the phosphorous containing polymer may be a phosphonate containing polymer, phosphonate containing copolymer, phosphonate containing oligomer, phosphorous containing polyester, a phosphorous containing oligoester, a phosphorous containing polyester-co-carbonate, a phosphorous containing oligoester-co-carbonate, or combinations thereof, and in some embodiments, the at least one phosphorous containing polymer or oligomer may be a polyester or oligoester including at least one phosphinate. In certain embodiments, the polymeric fibers may include a polyphosphonate, copoly(phosphonate ester), copoly(phosphonate carbonate), and/or their respective oligomers and a polyester.

Other embodiments of the invention are directed to polymer compositions including a polyphosphonate, copoly(phosphonate ester), copoly(phosphonate carbonate), and/or their respective oligomers and a polyester that maintains acceptable melt processing characteristics as compared to the unmodified polyester.

Still other embodiments of the invention are directed to polymeric fibers including a polyphosphonate, copoly(phosphonate ester), copoly(phosphonate carbonate), and/or their respective oligomers and a polyester that meets the UL or similar standardized fire resistance ratings required for a variety of consumer products without detracting from other important safety, environmental, manufacturing and consumer use requirements.

H. DESCRIPTION OF DRAWINGS

Not applicable.

I. DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that, as used herein and in the appended claims, the singular forms "a", "an", and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

The terms "flame retardant," "flame resistant," "fire resistant," or "fire resistance," as used herein, means that the composition exhibits a limiting oxygen index (LOI) of at least 27. "Flame retardant," "flame resistant," "fire resistant," or "fire resistance," may also refer to the flame reference standard ASTM D6413-99 for textile compositions, flame persistent test NF P 92-504, and similar standards for flame resistant fibers and textiles. Fire resistance may also be tested by measuring the after-burning time in accordance with the UL test (Subject 94). In this test, the tested materials are given classifications of UL-94 V-0, UL-94 V-1 and UL-94 V-2 on the basis of the results obtained with the ten test specimens. Briefly, the criteria for each of these UL-94-V-classifications are as follows:

UL-94 V-0 the average burning and/or glowing time after removal of the ignition flame should not exceed 5 seconds and none of the test specimens should release and drips which ignite absorbent cotton wool.

UL-94 V-1: the average burning and/or glowing time after removal of the ignition flame should not exceed 25 seconds and none of the test specimens should release any drips which ignite absorbent cotton wool.

UL-94 V-2: the average burning and/or glowing time after removal of the ignition flame should not exceed 25 seconds and the test specimens release flaming particles, which ignite absorbent cotton wool.

Fire resistance may also be tested by measuring afterburning time. These test methods provide a laboratory test procedure for measuring and comparing the surface flammability of materials when exposed to a prescribed level of radiant heat energy to measure the surface flammability of materials when exposed to fire. The test is conducted using small specimens that are representative, to the extent possible, of the material or assembly being evaluated. The rate at which flames travel along surfaces depends upon the physical and thermal properties of the material, product or assembly under test, the specimen mounting method and orientation, the type and level of fire or heat exposure, the availability of air, and properties of the surrounding enclosure. If different test conditions are substituted or the end-use conditions are changed, it may not always be possible by or from this test to predict changes in the fire-test-response characteristics measured. Therefore, the results are valid only for the fire test exposure conditions described in this procedure. The state-of-the-art approach to rendering polyesters flame retardant is to use additives such as brominated compounds or compounds containing aluminum and/or phosphorus. Use of the additives with polyesters has a deleterious effect on the processing characteristics and/or the mechanical performance of fibers produced from them. In addition, some of these compounds are toxic, and can leach into the environment over time making their use less desirable. In some countries certain brominated additives and aluminum and/or phosphorus containing additives are being phased-out of use because of environmental concerns.

The requirements for flame retarding polyesters are stringent in part because of the high processing temperatures and sensitivity of the polyesters' melt viscosity and consequently melt-spinnability into fibers. Moreover, flame retardant polyesters must be resistant to degradation by residual acidic groups in the polyester, exhibit long-term dimensional stability, have good dyeing characteristics in the final fiber, and exhibit good mechanical properties. These challenges combined with environmental regulations for toxicity and mitigation of leaching of the flame retardant into the environment over time have made it extremely difficult to meet all of these requirements.

Embodiments of the invention are directed to polymer fibers and flame retardant polyesters that include a thermoplastic polyester and one or more phosphonate containing polymer, copolymer, or oligomer. Embodiments of the invention are not limited by the type of phosphonate containing polymer, copolymer, or oligomer. For example, in various embodiments, the phosphonate containing polymer, copolymer, or oligomer may be derived from diaryl alkylphosphonates, diaryl arylphosphonates, or combinations thereof and an aromatic dihydroxy compound such as dihydric phenols, bisphenols, or combinations thereof. Such phosphonate containing polymers, copolymers, or oligomers may be block copolymers having discrete phosphonate and carbonate blocks that are covalently attached to one another, or the phosphonate containing polymer, copolymer, or oligomer may be random copolymers in which individual phosphonate and carbonate monomers or small phosphonate or carbonate segments, for example, 1 to 10 monomeric units, are covalently attached.

In certain embodiments, phosphonate containing polymer, copolymer, or oligomer may be the polyphosphonate, copoly(phosphonate ester), copoly(phosphonate carbonate) as described and claimed in U.S. Pat. Nos. 6,861,499, 7,816, 486, 7,645,850, and 7,838,604 and U.S. Publication No. 2009/0032770, each of which are hereby incorporated by reference in their entireties, or their respective oligomers. Briefly, such polymers and oligomers may include repeating units derived from diaryl alkyl- or diaryl arylphosphonates. For example, in some embodiments, such polyphosphonates or phosphonate oligomers may have a structure including:

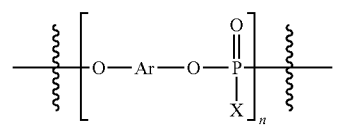

where Ar is an aromatic group and —O—Ar—O— may be derived from a compound having one or more, optionally substituted, aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, or combinations of these, X is a $C_{1-20}$ alkyl, $C_{2-20}$ alkene, $C_{2-20}$ alkyne, $C_{5-20}$ cycloalkyl, or $C_{6-20}$ aryl, and n is an integer from 1 to about 100, 1 to about 75, or 2 to about 50, or any integer between these ranges In other embodiments, the copoly(phosphonate ester), copoly(phosphonate carbonate) and their respective oligomers may have structures such as, but not limited to:

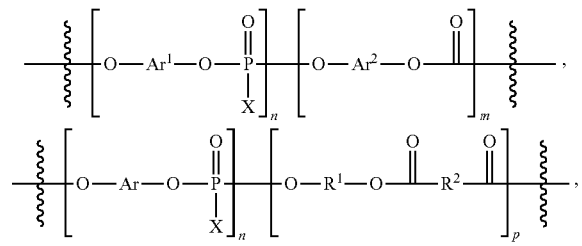

and combinations thereof, where Ar, $Ar^1$, and $Ar^2$ are each, independently, an aromatic group and —O—Ar—O— may be derived from a compound having one or more, optionally substituted aryl rings such as, but not limited to, resorcinols, hydroquinones, and bisphenols, such as bisphenol A, bisphenol F, and 4,4'-biphenol, phenolphthalein, 4,4'-thiodiphenol, 4,4'-sulfonyldiphenol, or combinations of these, X is a $C_{1-20}$ alkyl, $C_{2-20}$ alkene, $C_{2-20}$ alkyne, $C_{5-20}$ cycloalkyl, or $C_{6-20}$ aryl, $R^1$ and $R^2$ are aliphatic or aromatic hydrocarbons, and each m, n, and p can be the same or different and can, independently, be an integer from 1 to about 100, 1 to about 75, 2 to about 50, or any integer between these ranges. In certain embodiments, each m, n and p are about equal and generally greater than 5 or greater than 10.

In particular embodiments, the Ar, $Ar^1$, and $Ar^2$ may be bisphenol A and X may be a methyl group providing polyphosphonates, copoly(phosphonate carbonate), copoly(phosphonate ester), and their respective oligomers. Such compounds may have structures such as, but not limited to:

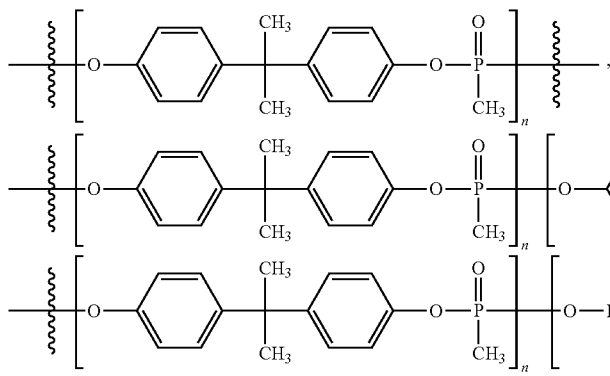

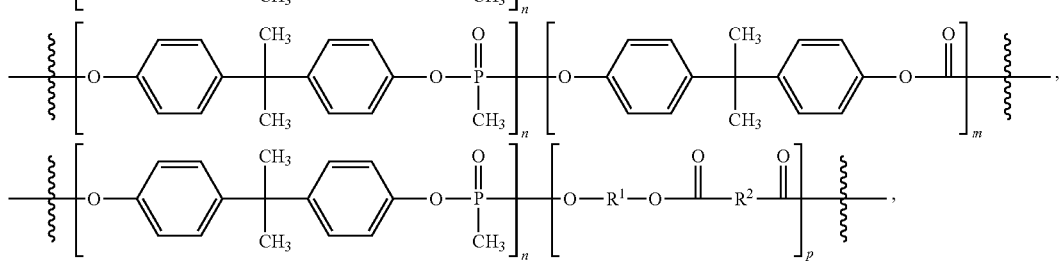

and combinations thereof, where each of m, n, p, and $R^1$ and $R^2$ are defined as described above. Such copoly(phosphonate ester), copoly(phosphonate carbonate) and their respective oligomers may be block copoly(phosphonate ester), copoly(phosphonate carbonate) or oligomers thereof in which each m and n is greater than about 1, and the copolymers contain distinct repeating phosphonate and carbonate blocks. In other embodiments, the copoly(phosphonate ester), copoly(phosphonate carbonate) or their respective oligomers can be random copolymers in which each n can vary and may be from 1 to about 10.

The weight average molecular weight (Mw) of each of the one or more phosphonate containing polymers and copolymers, and in particular embodiments, the polyphosphonate, copoly(phosphonate ester), and/or copoly(phosphonate carbonate), in the polymer fibers and flame retardant polyesters of the invention can range from about 10,000 g/mole to about 120,000 g/mole measured against polystyrene (PS) standards. The Mw of the oilgomeric phosphonates and cophosphonate oligomers can range from about 1,000 g/mole to about 10,000 g/mole measured against PS standards, and in some embodiments, the Mw can range from about 2,000 g/mole to about 6,000 g/mole measured against PS standards.

"Molecular weight," as used herein, is, generally, determined by relative viscosity ($\eta_{rel}$) and/or gel permeation chromatography (GPC). "Relative viscosity" of a polymer is measured by dissolving a known quantity of polymer in a solvent and comparing the time it takes for this solution and the neat solvent to travel through a specially designed capillary (viscometer) at a constant temperature. Relative viscosity is a measurement that is indicative of the molecular weight of a polymer. It is also well known that a reduction in relative viscosity is indicative of a reduction in molecular weight, and reduction in molecular weight causes loss of mechanical properties such as strength and toughness. GPC provides information about the molecular weight and molecular weight distribution of a polymer. It is known that the molecular weight distribution of a polymer is important to properties such as thermo-oxidative stability (due to different amount of end groups), toughness, melt flow, and fire resistance, for example, low molecular weight polymers drip more when burned.

The thermoplastic polyester used in various embodiments is not limited and can vary. For example, in some embodiments, the thermoplastic polyester can be poly(butylene terephthalate) (PBT), poly(ethylene terephthalate) (PET), poly(trimethylene terephthalate) (PTT), poly(ethylene naphthalate) (PEN), or any combination of these. Other polyesters not specifically described are also encompassed by these embodiments and can be combined with the phosphonate containing polymers, copolymers, and oligomers described above to create polymer fibers or flame retardant polyesters of the invention.

The amount of the phosphonate containing polymer, copolymer, or oligomer mixed can vary among embodiments and may be modified based on the desired properties of the flame retardant polyester. For example, in some embodiments, the amount of polyphosphonate, copoly(phosphonate ester), copoly(phosphonate carbonate) or their respective oligomer can be up to about 25% by weight relative to the host thermoplastic polyester. In other embodiments, the amount of polyphosphonate, copoly(phosphonate ester), copoly(phosphonate carbonate) or their respective oligomer can be from about 1 wt. % to about 25 wt. %, about 2 wt. % to about 20 wt. % or about 5 wt. % to about 15 wt. % relative to the host thermoplastic polyester.

In some embodiments, the polymer fibers and flame retardant polyesters may include additional additives that can be incorporated to improve one or more properties exhibited by the fiber or flame retardant polyester or provide, for example, color. Non-limiting examples of such additional additives include fire resistant additives, fillers, dyes, antioxidants, pigments, anti-dripping agents, wetting agents, lubricating agents, and other additives typically used with polyester fibers. In particular embodiments, the polyester fibers or flame retardant polyesters may include a dye and/or pigment. The fire resistant additives of such embodiments may include, but are not limited to, metal hydroxides, nitrogen containing flame retardants such as melamine cyanurate, phosphinate salts, organic phosphates, other phosphonates, organic sulfonate salts, siloxanes, and the like.

In particular embodiments, the polymer compositions of the invention can be used, incorporated into, or spun into fibers that can be used in woven and non-woven products. For example, the polymer compositions of various embodiments may be used in woven products such as clothing, carpet, flooring materials, wigs, and non-woven articles used in consumer products that must meet fire resistance standards. More particular exemplary embodiments include fabrics that are woven or knitted from polyester thread or yarn that are used in apparel and home furnishings, such as shirts, pants, jackets, hats, bed sheets, blankets, upholstered furniture and the like. Non-woven fibers prepared from the polymer compositions of the invention can be used in other applications cushioning and insulating material in pillows, blankets, quilts, comforters, and upholstery padding. Other embodiments include industrial polyester fibers, yarns, and ropes that are used, for example, in tire reinforcements, fabrics for conveyor belts, safety belts, coated fabrics, and plastic reinforcements with high-energy absorption.

The fibers of various embodiments may have any thickness or diameter, and the diameter of fibers may vary by their intended use. For example, in embodiments in which the fibers are used in textiles for clothing, the fiber diameter may be less than fibers used for carpeting or upholstery, which may have a smaller diameter than fibers used for industrial yarns and ropes. In some embodiments, the fiber diameter may be from about 2.0 µm to about 50 µm, about 5 µm to about 40 µm, about 10 µm to about 30 µm, or from about 12 µm to about 25 µm. In other embodiments, the density of the fiber may be from about 0.9 denier to about 30 denier, about 2 denier to about 25 denier, or 10 denier to about 15 denier. A "denier" is a well-known unit of linear density in the textile arts and is defined herein as the weight in grams of 9000 meters of a linear material.

Some embodiments of the invention are directed to other articles of manufacture incorporating the polymer compositions described above. For example, certain embodiments are directed to articles of manufacture such as, but not limited to, "plastic" bottles, films, tarpaulin, canoes, liquid crystal displays, holograms, filters, dielectric films, insulation for wires, insulating tapes, and other films, moldings, and other articles including the polymer compositions. In other embodiments, fibers including the polymer compositions of the invention can be incorporated into fiber reinforced composites that include a matrix material that is compatible with the polymer compositions described above. Such fiber reinforced composites may be incorporated into any of the articles described above. In still other embodiments, the polymer compositions described herein may be incorporated into wood finishes that can be applied to wood products as a liquid or gel.

Further embodiments of the invention are directed to methods for making the polymer compositions of the invention and methods for preparing articles of manufacture or fibers from the blended material. For example, some embodiments include methods for preparing a polymer composition including the steps of blending in a melt a thermoplastic polyester and a phosphonate containing polymer, copolymer, or oligomer. The melt blending may be carried out by any mixing technique, for example, melt mixing may be carried out in a brabender mixer or extruder. In some embodiments, the methods may include the steps of extruding the mixture after melt mixing and pelleting the resulting material. In other embodiments, the methods may include compressing the melt mixed material in rollers to create a film, spincasting a film, or blowmolding a film. In still other embodiments, the methods may include molding the melt mixed material into an article of manufacture.

In particular embodiments, the melt mixed polymer composition of the invention may be spun into fibers by fiber spinning In such embodiments, the solution viscosity of the melt mixed material may be modified to improve the processability of material during fiber spinning In particular, the solution viscosities of the melt mixed material during fiber spinning may be from about 0.04 dL/g to about 3.0 dL/g, about 0.1 dL/g to about 2.5 dL/g, or about 0.5 dL/g to about 2.0 dL/g, or any value between these ranges. In some embodiments, the solution viscosities may depend on the end application. For example, textile grade fibers may be prepared from a polymer composition having a solution viscosity of from about 0.04 dL/g to about 0.70 dL/g, and fibers for industrial applications such as tire cord may have a solution viscosity of from about 0.7 dL/g to about 1.0 dL/g. Monofilament fibers may be prepared from a polymer composition having a solution viscosity of from about 1.0 dL/g to about 2.0 dL/g. "Solution viscosity" as defined herein is the difference in time it takes for a polymer solution to pass through a capillary of specified length at a specific temperature versus the time it takes the pure solvent and can be measured according ASTM method D5225.

In certain embodiments, methods for the preparation of polymer fibers may include the step of heat setting the spun fibers. The term "heat setting" as used herein refers to thermal processing of the fibers in either a steam atmosphere or a dry heat environment. Heat setting gives fibers, yarns, or fabric dimensional stability and can provide other desirable properties such as higher volume, wrinkle resistance, and/or temperature resistance.

The polymer compositions, polymer fibers, articles of manufacture, and such described herein exhibit excellent flame resistance and a superior combination of properties including processing characteristics, mechanical properties, heat-setting characteristics, and ability to dye as compared to fiber compositions containing conventional brominated or phosphorus-containing flame retardants. Because the additives are polymeric or oligomeric, and form compatible mixtures with the host polyesters, they do not leach out and will generally not produce environmental concerns. Therefore, polymer compositions described herein including a thermoplastic polyester and one or more polyphosphonates, copoly(phosphonate ester)s, copoly(phosphonate carbonate)s, and/or their respective oligomers meet all of the processing and performance requirements specified for polyester fibers, and also overcome the environmental and toxicity considerations. Moreover, formulations containing these flame retardant materials were spun into high quality fibers, woven into test articles and tested for flame resistant properties.

Without wishing to be bound by theory, one plausible explanation for the unexpected behavior is that the polyphosphonate, copoly(phosphonate ester), copoly(phosphonate carbonate) or their respective oligomer may become incorporated into the polyester chemically via transesterification that can occur during high temperature processing. They may also become incorporated chemically via reaction of end groups present on the polyester or polyphosphonate, copoly(phosphonate ester), copoly(phosphonate carbonate) or their respective oligomer. Such end groups may be ester, phosphonate, carbonate, or hydroxyl. Due to chemical incorporation, the chance of leaching is negated. Yet another possible explanation is that the polyphosphonate, copoly(phosphonate ester), copoly(phosphonate carbonate) or their respective oligomer may become entangled in the polyester matrix. At the same time, the flame retardant materials satisfy the UL or similar standardized fire resistance requirements without detracting from important mechanical and processing properties. This is achieved by formulating a composition comprising a polyphosphonate, copoly(phosphonate ester), copoly(phosphonate carbonate) or their respective oligomer, and a polyester which is subsequently melt spun into a fiber.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

Preparation of Polyester Mixtures:

Poly(ethylene terephthalate) (PET, solution viscosity 0.62 dL/g) was melt mixed with polyphosphonate having a molecular weight of 100,000 g/mole (PS standards) to produce PET/phosphonate blends having phosphonate polymer loading levels ranging from 2.5% to 15% by weight. These blends where then spun into fibers. Each of the PET/polyphosphonate blends exhibited excellent processability and melt spinning produced 5 to 8 denier fibers and 18 to 22 denier fibers using the same production equipment used for pure PET fibers. Fibers then underwent heat setting and exhibited excellent heat-setting characteristics. Table 1 gives a description of each of the samples tested.

TABLE 1

Composition of textile samples

| Sample | Description |
|---|---|
| Control #1 | Commercial PET with fire retardant (FR) |
| Control #2 | PET, No FR |
| Control #3 | PET, No FR |
| FRX-100 @ 2.5% in PET | 2.5% phosphonate polymer |
| FRX-100 @ 5% in PET | 5% phosphonate polymer |
| FRX-100 @ 10% in PET | 10% phosphonate polymer |
| FRX-100 @ 15% in PET | 15% phosphonate polymer |

Example 2

Flame Resistance Testing:

The fibers described in Table 1 were tested according to ASTM 701 and exhibited good fire resistant behavior. Fabric samples woven from these compositions were tested according to ASTM D6413-99 "Standard Test Method for Flame Resistance of Textiles" with a slight modification in the procedure in that the samples were not conditioned before testing. Specifically, test samples were cut into 3 inches by 12 inches samples that were vertically mounted 0.75 inches above the flame burner. The flame had a height of 1.5 inches, and the sample was exposed to a flame for 12 seconds. The char length was determined after a weight of 200 g (tearing force) was attached to one edge of the burnt sample, and the opposite end was raised in a smooth continuous motion until the tearing force was supported by the sample. A minimum of three repeats were performed on each sample composition. The results are presented in Table 2.

TABLE 2

Flame Resistance Testing of Textile Compositions

| Sample and Trial | Time to self ext, (after flame time), sec | After Glow Time, sec | Char Length, (mm) | Melting/Dripping |
|---|---|---|---|---|
| Control 1 - 1 | 0 | 0 | 69 | None |
| Control 1 - 2 | 0 | 0 | 79 | None |
| Control 1 - 3 | 0 | 0 | 81 | None |
| Control 2 - 1 | 57 | 0 | 120 | flaming drips |
| Control 2 - 2 | 37 | 0 | 90 | flaming drips |
| Control 2 - 3 | 30 | 0 | 98 | flaming drips |
| Control 2 - 4 | 43 | 0 | 99 | flaming drips |
| Control 3 - 1 | 73 | 0 | 100 | flaming drips |
| Control 3 - 2 | 43 | 0 | 88 | flaming drips |
| Control 3 - 3 | 49 | 0 | 92 | flaming drips |
| FRX 2.5% - 1 | 0 | 0 | 86 | None |
| FRX 2.5% - 2 | 0 | 0 | 84 | None |
| FRX 2.5% - 3 | 0 | 0 | 81 | None |
| FRX 2.5% - 4 | 0 | 0 | 84 | None |
| FRX 2.5% - 5 | 0 | 0 | 61 | None |
| FRX 5% - 1 | 0 | 0 | 88 | None |
| FRX 5% - 2 | 0 | 0 | 81 | None |
| FRX 5% - 3 | 0 | 0 | 81 | None |
| FRX 5% - 4 | 0 | 0 | 76 | None |
| FRX 5% - 5 | 0 | 0 | — | None |
| FRX 10% - 1 | 0 | 0 | 74 | None |
| FRX 10% - 2 | 0 | 0 | 74 | None |
| FRX 10% - 3 | 0 | 0 | 74 | None |
| FRX 15% - 1 | 0 | 0 | 61 | None |
| FRX 15% - 2 | 0 | 0 | 76 | None |
| FRX 15% - 3 | 0 | 0 | 52 | None |
| FRX 15% - 4 | 0 | 0 | 73 | None |
| FRX 15% - 5 | 0 | 0 | 65 | None |

The results in Table 2 show that the control test #1, blank test #1, and all the samples containing the polyphosphonate self-extinguished before the flame was removed. Control samples 2 and 3 continued to burn after the flame was removed and produced flaming drips. Increasing the amount of polyphosphonate in the PET samples decreased the char length. In particular, FRX 2.5% exhibited an average char length of 80 mm, and FRX 15% exhibited an average char length of 65 mm. Samples including 5%, 10%, and 15% polyphosphonate did not show any blackening along the burned edges.

Example 3

Flame Persistence Testing:

PET/polyphosphonate fibers were prepared as described in Example 1 were fabricated into circular knitted fabric specimens. The fabric specimens were fabricated from a false-twisted PET yarn (130, dtex (225), f 38 bright-3.5 dtex/filament). Washing, drying and conditioning of all specimens was conducted according to ISO 6330 (2000-2008), using washing procedure 5A. The flame persistence test was conducted according to NF P 92-504 (1995) with some deviations from the standard due to the small sample size. The results from this test on several formulations are provided in Table 3.

TABLE 3

Flame Persistence Test Results
After Flame Time, seconds

| Test Number | Control (Virgin PET) | FRX 2.5% | FRX 5.0% | FRX 7.5% | FRX 10.0% |
|---|---|---|---|---|---|
| 1 | 40 | * | * | * | * |
| 2 | * | * | * | * | * |
| 3 | 21 | 5 | * | * | * |
| 4 | 20 | * | 3 | * | * |
| 5 | N/T | * | * | * | * |
| 6 | N/T | * | * | * | * |
| 7 | N/T | 5 | * | * | * |
| 8 | N/T | * | * | * | * |
| 9 | N/T | * | * | * | * |
| 10 | N/T | 3 | * | 3 | * |
| Flaming Debris | Yes | No | No | No | No |
| Non-Flaming Debris | No | Yes | Yes | No | Yes |

N/T = not tested
* = afterflame time was less than 2 seconds

The test results in Table 3 show the superior fire resistant behavior of the samples comprised of PET/phosphonate blends with phosphonate polymer or oligomer loading levels from 2.5 to 10.0% by weight.

The invention claimed is:

1. A polymer fiber comprising:
   a thermoplastic polyester selected from the group consisting of poly(butylene terephthalate) (PBT), poly(ethylene terephthalate) (PET), poly(trimethylene terephthalate) (PTT), poly(ethylene naphthalate) (PEN), or combinations thereof; and
   about 1 wt. % to about 25 wt. % of at least one phosphonate containing polymer, copolymer, oligomer, or combination thereof,
   wherein the polymer fiber comprises a fiber diameter of from about 2.0 µm to 50 µm, a fiber density of from about 0.9 denier to about 30 denier, and the polymer fiber exhibits a limiting oxygen index (LOI) of at least 27.

2. The polymer fiber of claim 1, wherein the phosphonate containing polymer, copolymer, oligomer, or combination thereof comprises at least one polyphosphonate, copoly(phosphonate ester), copoly(phosphonate carbonate), oligomeric phosphonate, oligomeric cophosphonate ester, oligomeric cophosphonate carbonate, and combinations thereof.

3. The polymer fiber of claim 1, wherein the phosphonate containing polymer, copolymer, oligomer, or combination thereof comprises repeating units derived from diaryl alkylphosphonate, diaryl arylphosphonate, and combinations thereof, and diphenyl methylphosphonate and aromatic dihydroxy compound.

4. The polymer fiber of claim 1, wherein the phosphonate containing polymer, copolymer, oligomer or combination thereof comprises at least one polyphosphonate, copoly(phosphonate ester), or copoly(phosphonate carbonate) having a molecular weight of from about 10,000 g/mole to about 120,000 g/mole measured against PS standards.

5. The polymer fiber of claim 1, wherein the phosphonate containing polymer, copolymer, oligomer or combination thereof comprises at least one oligomeric phosphonate, oligomeric cophosphonate ester, or oligomeric cophosphonate carbonate having a molecular weight of from about 1,000 g/mole to about 10,000 g/mole.

6. The polymer fiber of claim 1, further comprising one or more fire resistant additives, fillers, dyes, antioxidants, pigments, anti-dripping agents, lubricants, wetting agents, or combinations thereof.

7. The polymer fiber of claim 1, wherein the material from which the polymer fiber was made exhibits an Underwriters Laboratory-94 (UL-94) of V-0 measured at a thickness of 0.8 mm.

8. A method for producing polymer fiber comprising:
   melt blending a thermoplastic polyester selected from the group consisting of poly(butylene terephthalate) (PBT), poly(ethylene terephthalate) (PET), poly(trimethylene terephthalate) (PTT), poly(ethylene naphthalate) (PEN), or combinations thereof and
   about 1 wt. % to about 25 wt. % of at least one phosphonate containing polymer, copolymer, oligomer, or combination thereof to produce a polymer composition; and
   fiber spinning the polymer composition to produce polymer fibers, and wherein the polymer fiber comprises a fiber diameter of from about 2.0 µm to 50 µm, a fiber density of from about 0.9 denier to about 30 denier, and the polymer fiber exhibits a limiting oxygen index (LOI) of at least 27.

9. The method of claim 8, further comprising heat setting the polymer fibers.

10. The method of claim 8, further comprising adding one or more fire resistant additives, fillers, dyes, antioxidants, pigments, anti-dripping agents, lubricants, wetting agents, or combinations thereof to the polymer composition during melt mixing.

11. The method of claim 8, further comprising weaving the polymer fibers to produce a fabric or textile.

12. The method of claim 8, further comprising winding the polymer fibers to produce a rope or yarn.

13. The method of claim 8, further comprising mixing the polymer fibers with a matrix material to produce a reinforced polymer composite.

14. The method of claim 8, wherein the polymer composition comprises a solution viscosity of from about 0.04 dL/g to about 3.0 dL/g.

15. The method of claim 8, wherein the phosphonate containing polymer, copolymer, oligomer, or combination thereof comprises at least one polyphosphonate, copoly(phosphonate ester), copoly(phosphonate carbonate), oligomeric phosphonates oligomeric cophosphonate esters, oligomeric cophosphonate carbonates, or combinations thereof.

16. The method of claim 8, wherein the phosphonate containing polymer, copolymer, oligomer, or combination thereof comprises repeating units derived from diaryl alkylphosphonate, diaryl arylphosphonate, and combinations thereof, and diphenyl methylphosphonate and aromatic dihydroxy compound.

17. The method of claim 8, wherein the phosphonate containing polymer, copolymer, oligomer or combination thereof comprises at least one polyphosphonate, copoly(phosphonate ester), or copoly(phosphonate carbonate) having a molecular weight of from about 10,000 g/mole to about 120,000 g/mole.

18. The method of claim 8, wherein the phosphonate containing polymer, copolymer, oligomer or combination thereof comprises at least one oligomeric phosphonate, oligomeric cophosphonate ester, or oligomeric cophosphonate carbonate having a molecular weight of from about 1,000 g/mole to about 10,000 g/mole.

19. An article of manufacture comprising a flame retardant polyester comprising:
   a thermoplastic polyester selected from the group consisting of poly(butylene terephthalate) (PBT), poly(ethylene terephthalate) (PET), poly(trimethylene terephthalate) (PTT), poly(ethylene naphthalate) (PEN), or combinations thereof; and
   about 1 wt. % to about 25 wt. % of at least one phosphonate containing polymer, copolymer, oligomer, or combination thereof,
   wherein the article of manufacture is a polymer fiber comprising a fiber diameter of from about 2.0 µm to 50 µm, a fiber density of from about 0.9 denier to about 30 denier, and the polymer fiber exhibits a limiting oxygen index (LOI) of at least 27.

20. The article of manufacture of claim 19, wherein the polymer fiber is used in clothing, carpet, flooring materials, wigs, and non-woven articles used in consumer products.

21. The article of manufacture of claim 19, wherein the polymer fiber is used in shirts, pants, jackets, hats, bed sheets, blankets, upholstered furniture, insulating material, pillows, blankest, quilts, comforters, yarns, ropes, tire reinforcements, fabrics for conveyor belts, safety belts, coated fabrics, or plastic reinforcements with high-energy absorption upholstery padding.

22. The article of manufacture of claim 19, wherein the polymer fiber is used in a woven textile product.

23. The article of manufacture of claim 19, wherein the polymer fiber is used in a non-woven textile product.

24. The article of manufacture of claim 19, wherein the polymer fiber is used in a carpet.

25. The article of manufacture of claim 19, wherein the polymer fiber exhibits an Underwriters Laboratory-94 (UL-94) of V-0 measured at thickness of 0.8 mm.

* * * * *